(12) United States Patent
Kim et al.

(10) Patent No.: US 8,208,482 B2
(45) Date of Patent: Jun. 26, 2012

(54) TRANSMITTING PACKETS BETWEEN PACKET CONTROLLER AND NETWORK PROCESSOR

(75) Inventors: Su-Hyun Kim, Seoul (KR); Jong-Sang Oh, Suwon (KR); Byung-Gu Choe, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2594 days.

(21) Appl. No.: 10/778,363

(22) Filed: Feb. 17, 2004

(65) Prior Publication Data

US 2004/0165613 A1  Aug. 26, 2004

(30) Foreign Application Priority Data

Feb. 20, 2003  (KR) .................. 10-2003-0010824

(51) Int. Cl.
*H04L 12/54* (2006.01)
(52) U.S. Cl. ................. 370/412; 370/428; 370/466
(58) Field of Classification Search .................. 370/412, 370/428, 429, 466
See application file for complete search history.

(56) References Cited

U.S. PATENT DOCUMENTS

| | | | |
|---|---|---|---|
| 4,488,289 A | 12/1984 | Turner | |
| 5,602,995 A * | 2/1997 | Hendel et al. ................. | 711/209 |
| 5,812,775 A * | 9/1998 | Van Seters et al. ........... | 709/213 |
| 5,832,236 A * | 11/1998 | Lee ............................... | 709/249 |
| 5,886,701 A * | 3/1999 | Chauvin et al. ............... | 345/418 |
| 6,046,999 A * | 4/2000 | Miki et al. ................. | 370/395.52 |
| 6,185,212 B1 * | 2/2001 | Sakamoto et al. ........ | 370/395.72 |
| 6,434,115 B1 | 8/2002 | Schwartz et al. | |
| 6,526,053 B1 | 2/2003 | Ishiba et al. | |
| 6,580,717 B1 * | 6/2003 | Higuchi et al. ................ | 370/401 |
| 6,636,479 B1 * | 10/2003 | Chikamatsu et al. ......... | 370/229 |
| 6,687,247 B1 * | 2/2004 | Wilford et al. ................ | 370/392 |
| 6,724,759 B1 * | 4/2004 | Chang et al. .................. | 370/389 |
| 6,947,970 B2 * | 9/2005 | Berry ............................. | 709/212 |
| 6,975,646 B2 * | 12/2005 | Yamashita ..................... | 370/466 |
| 7,006,526 B1 * | 2/2006 | Biederman ..................... | 370/466 |
| 7,076,569 B1 * | 7/2006 | Bailey et al. .................. | 709/250 |
| 7,219,121 B2 * | 5/2007 | Kaniyar et al. ................ | 709/201 |
| 7,227,841 B2 * | 6/2007 | Mullendore et al. .......... | 370/230 |
| 7,339,943 B1 * | 3/2008 | Mammen et al. ............. | 370/414 |
| 7,349,398 B1 * | 3/2008 | Favor et al. .................... | 370/394 |
| 7,369,574 B1 * | 5/2008 | Parruck et al. ................ | 370/474 |
| 7,643,486 B2 * | 1/2010 | Belz et al. ...................... | 370/392 |
| 2002/0024928 A1 * | 2/2002 | Furuichi ........................ | 370/218 |
| 2002/0126673 A1 * | 9/2002 | Dagli et al. .................... | 370/392 |
| 2002/0186695 A1 * | 12/2002 | Schwartz et al. .............. | 370/392 |
| 2003/0058862 A1 * | 3/2003 | Lansing et al. ................ | 370/392 |
| 2003/0072318 A1 * | 4/2003 | Lam et al. ...................... | 370/428 |
| 2003/0110229 A1 | 6/2003 | Kulig et al. | |
| 2003/0123454 A1 * | 7/2003 | Karim et al. ............. | 370/395.72 |
| 2003/0231631 A1 | 12/2003 | Pullela | |
| 2004/0156392 A1 * | 8/2004 | Walls et al. .................... | 370/469 |
| 2005/0249217 A1 * | 11/2005 | Maeda ........................ | 370/395.1 |
| 2007/0130356 A1 * | 6/2007 | Boucher et al. ............... | 709/230 |

* cited by examiner

*Primary Examiner* — Hassan Kizou
*Assistant Examiner* — Roberta A Shand
(74) *Attorney, Agent, or Firm* — H.C. Park & Associates, PLC

(57) ABSTRACT

An apparatus adapted to transmit and receive a packet between a network processor and a packet controller includes: the packet controller receiving an input packet from an input interface; a packet buffer storing and delivering the input packet the received input packet in response to a request from the network processor; a packet queue delivering information for the stored input packet from the packet controller to the network processor; and the network processor receiving a packet from the packet buffer and delivering the packet to an output interface using information for the input packet from the packet queue.

41 Claims, 5 Drawing Sheets

FIG. 4A

| PACKET DESCRIPTOR INDEX | PACKET LENGTH |
|---|---|

FIG. 4B

| Dest MAC ||
|---|---|
| Dest MAC | Src MAC |
| Src MAC ||
| Pkt_Type | IP_Header_0 |
| IP_Header_0 | IP_Header_1 |
| IP_Header_1 | IP_Header_2 |
| IP_Header_2 | IP_Header_3 |
| IP_Header_3 | IP_Header_4 |
| IP_Header_4 | Input_Port |
| Reserved | Start of Pkt Offset |

TRANSMITTING PACKETS BETWEEN PACKET CONTROLLER AND NETWORK PROCESSOR

CROSS-REFERENCE TO RELATED APPLICATIONS AND CLAIM OF PRIORITY

This application makes reference to, incorporates the same herein, and claims all benefits accruing under 35 U.S.C. §119 from an application for APPARATUS FOR DISTRIBUTIVELY PROCESSING BGP AND METHOD THEREOF earlier filed in the Korean Intellectual Property Office on 20 Feb. 2003 and there duly assigned Serial No. 2003-10824.

BACKGROUND OF INVENTION

1. Technical Field

The present invention relates to transmitting packets between a packet controller and network processor. More particularly, the present invention relates to transmitting and receiving packets, capable of improving performance, and reducing a burden of copying the whole packet, by informing the network processor of packet information (a packet address, size, input port, etc.) received from the packet controller and by processing the packet information.

2. Related Art

Due to an explosive increase in the amount of Internet traffic, demands for a variety of services such as MPLS (MultiProtocol Label Switching), MPLS VPN (Virtual Private Network), IP (Internet Protocol) VPN, and QoS (Quality of Service) are increasing as well as a demand for high bandwidth and high speed packet processing.

But, it is difficult to meet time-to-market conditions when using a host processor or ASIC (Application Specific Integrated Circuit) of a related art.

Therefore, a network processor has emerged and present products for high speed packet processing (1G/2.5G/10G) are now being brought into the market, these products having a strong point of programmability for accepting various services, thereby meeting market demand.

An external interface of such a network processor interfaces a switch fabric for its upstream operations and is connected to a data link layer for its downstream operations. The data link layer (layer 2) is delivered to a network processor through a packet controller for mainly processing the relevant data link protocol packet.

Generally, the packet controller handles a packet of the "layer 2", and the network processor could handle a packet of the "layer 2" through a "layer 7". In a communication system, packet processing between a packet controller and a network processor frequently occurs and also transmission and reception of a packet between different data link layers occurs. For such processes, a packet conversion process is required.

More particularly, in a communication system for supporting multi-services (e.g. ATM: (Asynchronous Transfer Mode), Ethernet, POS: Packet Over SONET, etc.), such packet conversion is indispensable.

FIG. 1 is a block diagram of an apparatus for transmitting and receiving a packet between a packet controller and a network processor according to a related art. Referring to FIG. 1, an apparatus for transmitting and receiving a packet of a related art includes: a packet controller 11; a first packet buffer 12; a network processor 13; and a second packet buffer 14. The network processor 13 consists of a control packet processing unit 131 and a data packet processing unit 132.

The operation of such an apparatus for transmitting and receiving a packet is as follows. A packet of the "layer 2" is input to the packet controller 11. The input packet is stored in the first packet buffer 12 which belongs to the region of the packet controller 11.

After that, to transmit the packet to the network processor 13, the packet controller 11 copies the input packet stored in the first packet buffer 12 to the second packet buffer 14, delivering an interrupt signal to the control packet processing unit 131 of the network processor 13. The input packet that has been copied to the second packet buffer 14, is packet-converted by the data packet processing unit 132 of the network processor 13 and output.

During a packet processing between the network processor 13 and the packet controller 11, each apparatus processes a packet by copying a packet to its memory region (i.e. the first packet buffer and the second packet buffer, respectively) managed by itself, so that deteriorated performance occurs.

Also, upon transmission and reception of a packet between different data link layers (e.g. ATM→Ethernet), increased process overhead due to packet header differences occur.

U.S. Pat. No. 6,526,053 to Ishiba et al., entitled METHOD AND APPARATUS FOR TRANSMITTING PACKETS AND NETWORK USING THE SAME, issued on Feb. 25, 2003, relates to a packet transmitting method of processing a packet having a control information area and a user information area by a functional block in a node and, thereafter, transmitting the packet from the node. Whether information of the user information area is useless for the user or not is discriminated on the basis of information of the control information area or the user information area. The packet judged to be useless is converted into a predetermined format in which the number of alternating times of a bit pattern has been reduced and the packet is allowed to pass through the functional block. The bit pattern of the packet is returned to a state before the conversion at least before the packet is transmitted from the node.

U.S. Pat. No. 6,434,115 to Schwartz et al., entitled SYSTEM AND METHOD FOR SWITCHING PACKETS IN A NETWORK, issued on Aug. 13, 2002, relates to a switching node for transferring packets, each including a destination address, in a network includes a plurality of input port modules, a plurality of output port modules and a switching fabric, including a packet meta-data processor and a packet switch. Each input port module is connected to a communication link for receiving packets thereover, and each output port module is connected to a communication link for transmitting packets thereover. Each input port module, upon receiving a packet, buffers the packet and generates a meta-data packet therefor identifying the output port module that is to transmit the packet and packet identifier information, and provides it to the packet meta-data processor. The packet meta-data processor receives the meta-data packets generated by all of the input port modules and operational status information from all of the output port modules and for each output port module, processes the meta-data packets received from all of the input port modules in connection with the operational status information to determine whether the packet should be passed or dropped. If the packet meta-data processor determines that a packet associated with a meta-data packet is to be dropped, it will notify the input port module in which the packet is buffered, which, in turn, will discard the packet. On the other hand if the packet meta-data processor determines that the packet associated with the meta-data packet is not to be dropped, it will enqueue the meta-data packet for the associated output port module. Each output port module retrieves meta-data packets from its respective meta-data packet queue maintained therefor by the packet meta-data processor. For each meta-data packet retrieved by an output port module, the output port module will request that the input port module identified in the meta-data packet transfer the packet identified in the input port module thereto through the packet switch. When the output port module receives the packet, it will transmit it over the communication link connected thereto.

U.S. Pat. No. 4,488,289 to Turner, entitled INTERFACE FACILITY FOR A PACKET SWITCHING SYSTEM, issued on Dec. 11, 1984, relates to a communication method and packet switching system in which packets comprising logical addresses and voice/data information are communicated through the system by packet switching networks which are interconnected by high-speed digital trunks with each of the latter being directly terminated on both ends by trunk controllers. During initial call setup of a particular call, central processors associated with each network in the desired route store the necessary logical to physical address information in the controllers which perform all logical to physical address translations on packets of the call. Each network comprises stages of switching nodes which are responsive to the physical address associated with a packet by a controller to communicate this packet to a designated subsequent node. The nodes provide for variable packet buffering, packet address rotation techniques, and intranode and internode signaling protocols. Each packet has a field which is automatically updated by the controllers for accumulating the total time delay incurred by the packet in progressing through the networks. Each processor has the capability of doing fault detection and isolation on the associated network, trunks, and controllers by the transmission of a single test packet. The testing is done solely in response to the test packet and no preconditioning of controllers or networks is necessary.

U.S. Patent Publication No. 2002/0186695 to Schwartz et al., entitled PACKET FORWARDING APPARATUS AND METHOD USING PIPELINED NODE ADDRESS PROCESSING, issued on Dec. 12, 2002, relates to a switching node for transferring packets, each including a destination address, in a network includes a plurality of input port modules, a plurality of output port modules and a switching fabric, including a packet meta-data processor and a packet switch. Each input port module is connected to a communication link for receiving packets thereover, and each output port module is connected to a communication link for transmitting packets thereover. Each input port module, upon receiving a packet, buffers the packet and generates a meta-data packet therefor identifying the output port module that is to transmit the packet and packet identifier information, and provides it to the packet meta-data processor. The packet meta-data processor receives the meta-data packets generated by all of the input port modules and operational status information from all of the output port modules and for each output port module, processes the meta-data packets received from all of the input port modules in connection with the operational status information to determine whether the packet should be passed or dropped. If the packet meta-data processor determines that a packet associated with a meta-data packet is to be dropped, it will notify the input port module in which the packet is buffered, which, in turn, will discard the packet. On the other hand if the packet meta-data processor determines that the packet associated with the meta-data packet is not to be dropped, it will enqueue the meta-data packet for the associated output port module. Each output port module retrieves meta-data packets from its respective meta-data packet queue maintained therefor by the packet meta-data processor. For each meta-data packet retrieved by an output port module, the output port module will request that the input port module identified in the meta-data packet transfer the packet identified in the input port module thereto through the packet switch. When the output port module receives the packet, it will transmit it over the communication link connected thereto.

U.S. Patent Publication No. 2003/0072318 to Lam et al., entitled SYSTEM AND METHOD FOR PACKET FORWARDING, issued on Apr. 17, 2003, relates to a system and method for packet forwarding. The packet forwarding improves the performance of common network security applications. The system includes an operating system kernel, a plurality of packet forwarding paths, and a packet classifier. The method includes means for receiving network packets, means for receiving state information from a plurality of external agents, means for selecting a forwarding path from a plurality of forwarding paths based on the state information, and means for transmitting packets.

U.S. Patent Publication No. 2003/0231631 to Pullela, entitled METHOD AND APPARATUS FOR PROCESSING PACKETS BASED ON INFORMATION EXTRACTED FROM THE PACKETS AND CONTEXT INDICATIONS SUCH AS BUT NOT LIMITED TO INPUT INTERFACE CHARACTERISTICS issued on Dec. 18, 2003, relates to a context vector, typically used in a lookup operation of an associative memory, which is generated based on a context of a received packet and the packet itself. In one implementation, multiple interfaces can share a common access control list as the context vector provides an indication of the result of unique processing required because of varying contexts, such as, but not limited to different interfaces, source addresses, and virtual network addresses. One implementation includes an input interface circuitry, a context indicator generator, a lookup word field generator, and an associative memory. The context indicator generator generates a context vector corresponding to a characteristic of the input interface circuitry. The lookup word field generator generates one or more lookup word vectors based on the packet. The associative memory performs a lookup operation based on the context vector and lookup word vectors.

U.S. Patent Publication No. 2003/0110229 to Kulig et al, entitled SYSTEM AND METHOD FOR CONTROLLING TRANSMISSION OF DATA PACKETS OVER AN INFORMATION NETWORK, issued on Jun. 12, 2003, relates to an apparatus for controlling transmission of data packets in an information network which comprises a Regional Transaction Processor (RTP) operable to communicate with a Data Enabling Device (DED) and at least one workstation. The DED searches data packets for content match information. The RTP includes instructions to generate information to include in a prompt to be presented at the workstation when the content match information is detected in at least one of the data packets. The prompt is based on information in the data packet. Transmission of the data packets through the information network is suspended by the DED until a response to the prompt is received that authorizes downloading the data packets to the workstation. If transmission of the data packets to the workstation is not authorized, the data packets are discarded by the DED.

While each of the afore-cited references have features in common with the present invention, none of these references teach or suggest the present invention, namely, an apparatus and method for transmitting and receiving a packet, capable of improving performance, and reducing a burden of copying the whole packet, by informing the network processor of packet information (a packet address, size, input port, etc.) received from the packet controller, and by processing the information.

SUMMARY OF THE INVENTION

To solve the above-indicated problems, it is, therefore, an object of the present invention to provide an apparatus and method for transmitting and receiving a packet between a network processor and a packet controller responsible for packet processing of a general data link layer.

It is another object of the present invention to provide an apparatus and method for transmitting and receiving a packet, capable of improving performance, and reducing a burden of copying the whole packet, by informing the network processor of packet information (a packet address, size, input port, etc.) received from the packet controller, and by processing the information.

It is still another object of the present invention to provide an apparatus and method for transmitting and receiving a packet, capable of resolving problems due to packet header differences upon delivery of a packet between different data link layers.

The foregoing and other objects and advantages are realized by providing an apparatus for transmitting and receiving a packet between a network processor and a packet controller according to the present invention, the apparatus including: an input interface adapted to receive an input packet and to deliver the received input packet to the packet controller; a packet buffer adapted to store the input packet received from the packet controller and to deliver the input packet in response to a request from the network processor; a packet queue adapted to deliver information for the input packet stored in the packet buffer from the packet controller to the network processor; and the network processor adapted to receive a packet from the packet buffer and to deliver the packet to an output interface, using information for the input packet delivered through the packet queue.

Also, the foregoing and other objects and advantages are realized by providing a method for transmitting and receiving a packet between a network processor and a packet controller according to the present invention, the method including: receiving a packet from an external input interface through the packet controller, storing the packet; queuing information of the stored packet, delivering the information of the stored packet to the network processor; receiving, at the network processor, the stored packet using the previously delivered information; and performing, at the network processor, an interface conversion process for the received packet and delivering the converted packet to an output interface.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 4a through FIG. 4c are drawings showing a structure of data for packet processing according to the present invention.

DETAILED DESCRIPTION OF EXEMPLARY EMBODIMENTS

An embodiment of the present invention will now be described with reference to the accompanying drawings. The matters defined in the description such as a detailed construction and elements are merely provided to assist in a comprehensive understanding of the invention. Thus, it is apparent that the present invention can be carried out without those defined matters. Also, well-known functions or constructions are not described in detail since they would obscure the invention in unnecessary detail.

Figure 2:
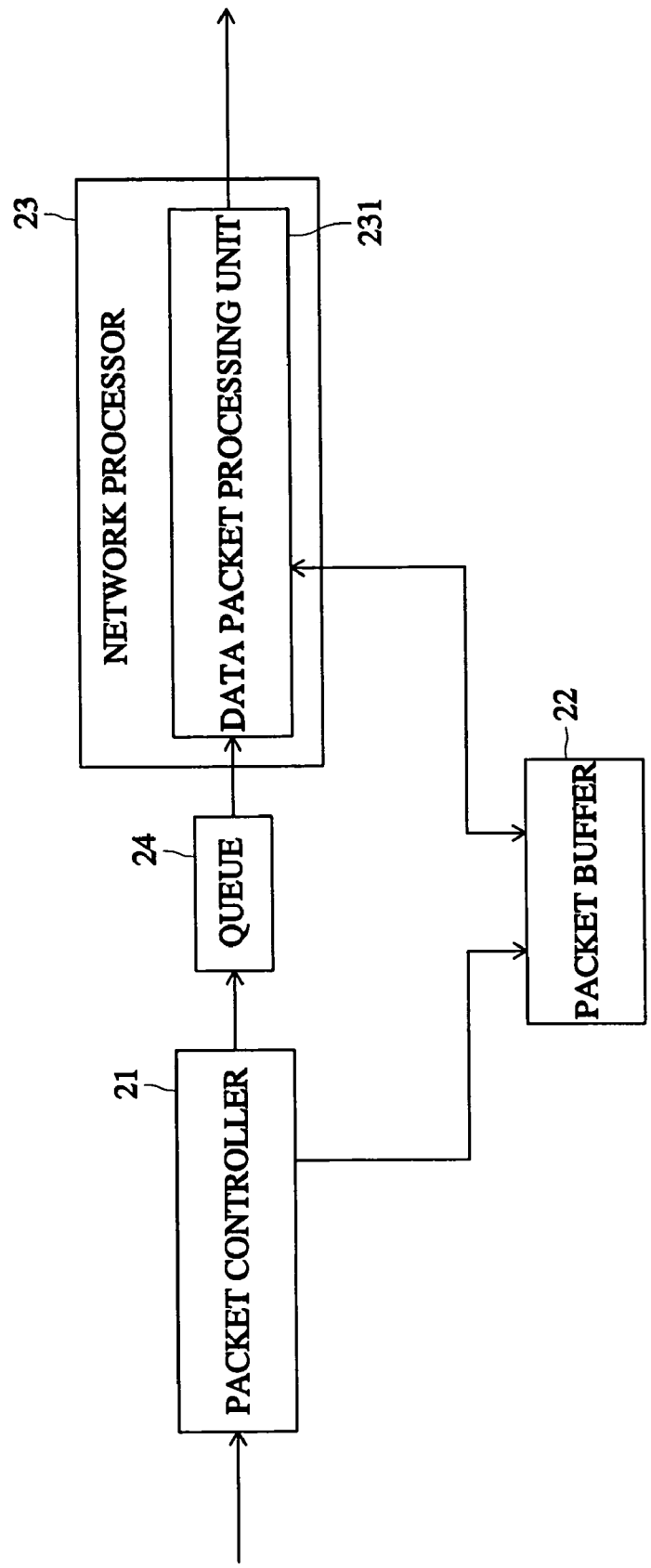
FIG. 2 is a block diagram of an apparatus for transmitting and receiving a packet between a packet controller and a network processor according to one embodiment of the present invention.

FIG. 2 is a block diagram of an apparatus for transmitting and receiving a packet between a packet controller and a network processor according to one embodiment of the present invention. Referring to FIG. 2, an apparatus for transmitting a packet according to the present invention includes: a packet controller 21; a packet buffer 22, a network processor 23; and a packet queue 24. The network processor 23 further includes a data packet processing unit 231.

The packet controller 21 reads a packet from an input interface, stacks a packet on the packet buffer 22, and the network processor 23 consists of a control packet processing unit for processing a control packet and a data packet processing unit 231 for processing a data packet. In the present invention, only a data packet processing unit 231 is used.

The packet buffer 22 for processing a packet and the packet queue 24 for communicating with the packet controller 21 serve as an external interface of the network processor 23.

Operation of the present invention will be described according to the embodiment shown in FIG. 2. In the embodiment of the present invention, the Ethernet interface is used for an input interface and POS (Packet over SONET (Synchronous Optical Network)) is used for an output interface. Also, the data packet processing unit 231 within the network processor 23 performs IPv4 (Internet Protocol version 4) packet lookup and forwarding functions.

Of course, the input/output interfaces applied to the present invention can accommodate all kinds of data link layers. ATM, Frame Relay, Ethernet, POS (Packet over SONET), EOS (Ethernet over SONET), RPR(Resilient Packet Ring), etc. are generally used data link layers.

Figure 3:
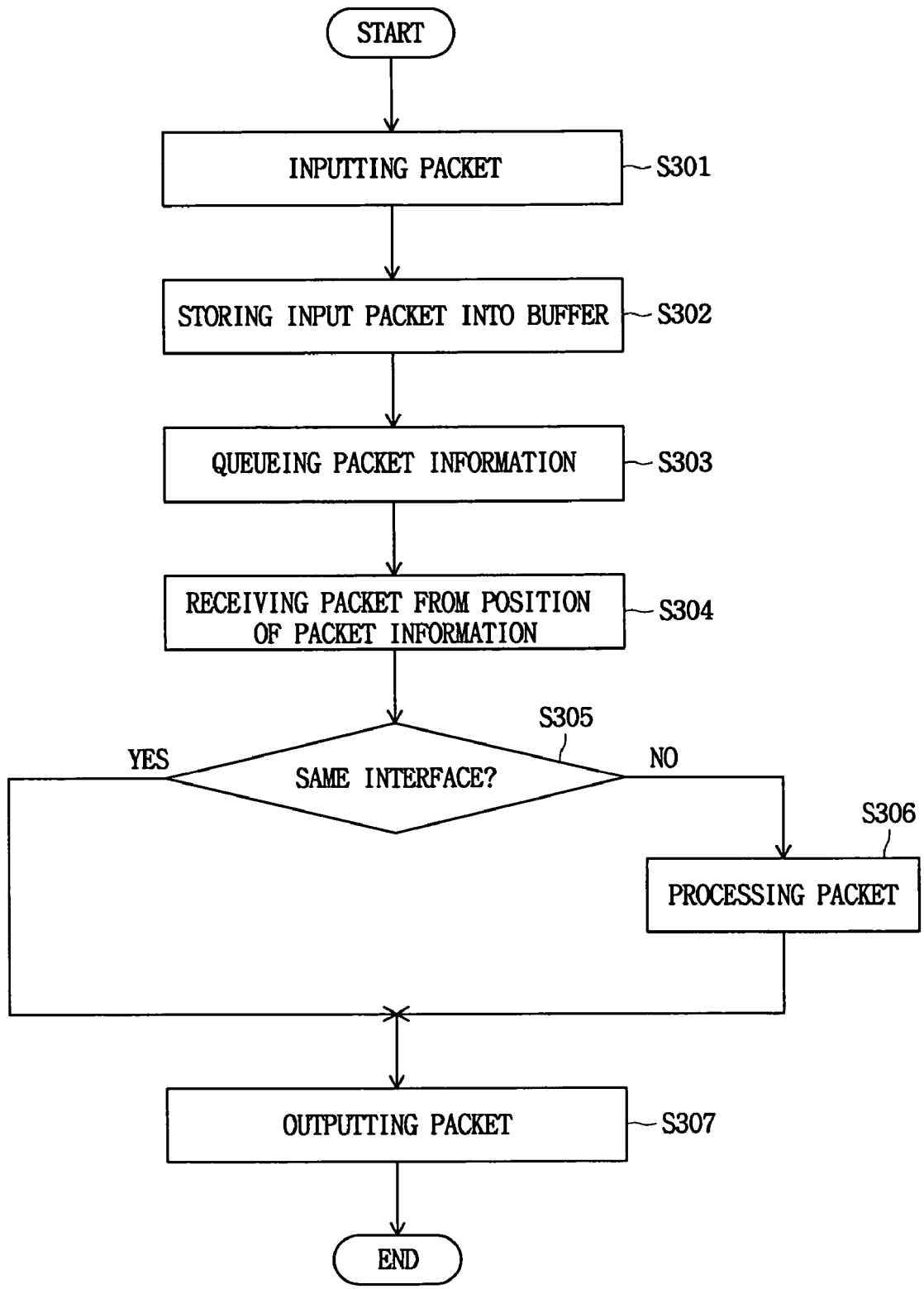
FIG. 3 is a flowchart of a method for transmitting and receiving a packet between a packet controller and a network processor according to one embodiment of the present invention.

FIG. 3 is a flowchart of a method for transmitting and receiving a packet between a packet controller and a network processor according to one embodiment of the present invention.

The operation of the present invention will be described with reference to FIG. 2 and FIG. 3. The packet controller 21 receives a packet by receiving a PDU (Protocol Data Unit) of a data link layer (S301). Namely, according to the present embodiment, the packet controller 21 receives an Ethernet MAC (Media Access Control) frame (packet). The packet controller 21 performs data link layer-related operations such as error control and flow control for the input packet. Therefore, an Ethernet controller is used for the packet controller 21 of the embodiment according to the present invention.

Also, the packet controller 21 stores the input packet in the packet buffer 22 (S302). The packet buffer 22 is managed by being divided into predetermined sizes for convenience in maintenance and management, and the stored input packet consists of an Ethernet header and an Ethernet payload.

Then, the input packet information is queued between the packet controller 21 and the data packet processing unit 231 of the network processor 23 (S303).

The step of S303 will be descried in more detail in the following. The packet controller 21 queues the input packet information into the packet queue 24(S303). The queued input packet information includes an input port, a packet buffer address, a packet size, etc. Also, the packet queue 24 applied to the present invention operates in a circular FIFO (First In First Out) queue manner and, therefore, is maintained and managed using head and tail pointers.

Namely, the packet controller 21 queues the input packet information to an entry designated by the tail pointer. Then, a determination is made as to whether the relevant entry is empty or filled. If the entry is empty, the input packet information is inserted into the relevant entry and the fact that the relevant entry has been filled, is marked.

After that, the data packet processing unit 231 of the network processor 23 de-queues the input packet information from the packet queue 24.

Namely, the data packet processing unit 231 reads a head pointer of the packet queue 24, bringing packet information of the relevant entry. Then, the data packet processing unit 231 marks that the relevant entry is empty after de-queuing the input packet information.

Also, the data packet processing unit 231 performs operations related to the relevant packet using the input packet information (S304 through S307).

Namely, the data packet processing unit 231 receives a packet from the position of the input packet within the packet buffer 22, included in the packet information (S304).

Then, the data packet processing unit 231 performs processes related to the header of the relevant packet. Generally, in performing a packet header-related process, processing the relevant packet according to a difference between a protocol of an input packet and a protocol desired to be output, is important. For such processing, in the present invention, a determination is made as to whether a transmission of a packet between the input interface and the output interface is a transmission between the same interfaces (S305). If there is a transmission between the same interfaces, a packet is output without conversion of a header (S307), and if an input interface is the Ethernet and an output interface is POS, as the present embodiment, the relevant packet processing procedure is performed (S306).

Figure 4C:
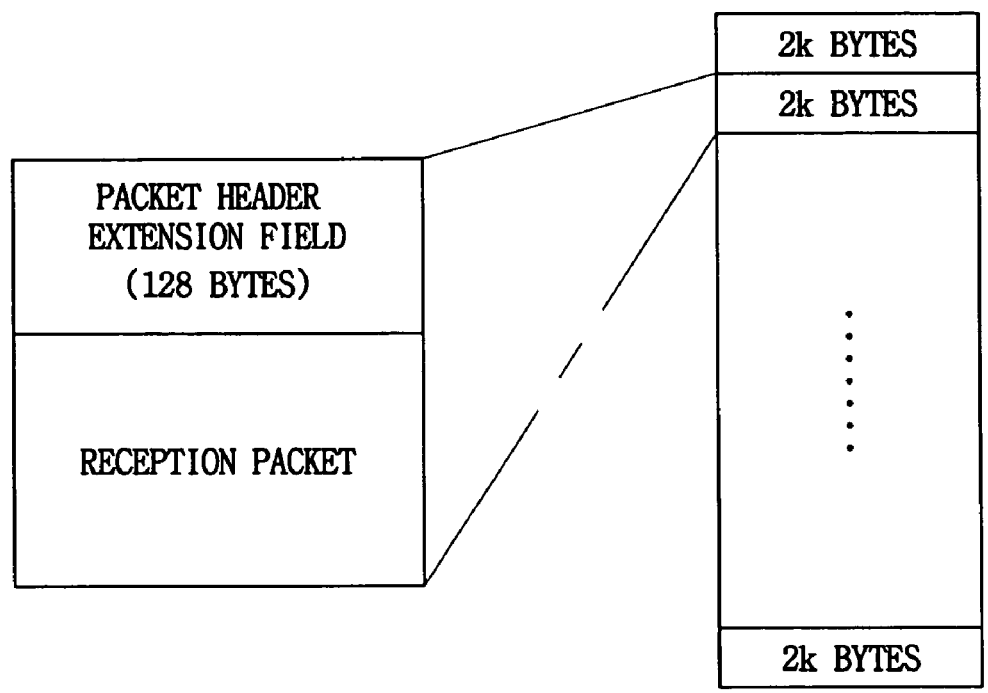

Namely, a packet processing procedure of S306 according to the exemplary embodiment of the present invention is as follows. Among the Ethernet header, a broadcasting/multicasting/unicasting processing from a destination MAC, ARP (Address Resolution Protocol) learning from a source MAC, processing according to a packet type from the Ethernet packet type are performed, respectively. Also, the data packet processing unit 231 performs IPv4 lookup for the relevant packet using an internal data structure of a packet (FIG. 4*a*, FIG. 4*b*) and a detailed structure within the packet buffer 22 (FIG. 4*c*). Thus, the data packet processing unit 231 converts the Ethernet header into a POS header to forward a packet to a POS interface. Since a size of each packet header is different, a starting point of a header is changed, which will be described with reference to FIG. 4*a* through FIG. 4*c*.

Then, after processing (S306) for the input packet by the data packet processing unit 231 is completed, a packet is forwarded to the output port (S307).

Figure 1:
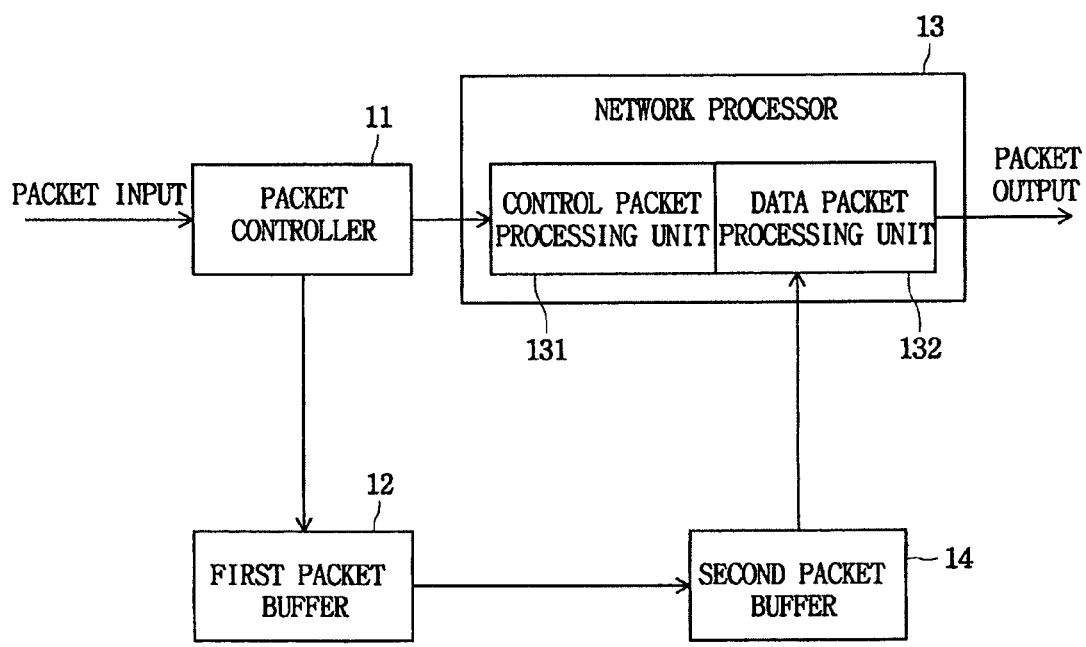
FIG. 1 is a block diagram of an apparatus for transmitting and receiving a packet between a packet controller and a network processor according to a related art.

The processes for generating, at the packet controller 11, an interruption to the control packet processing unit 131 of the network processor 13 and for processing a response thereof; the process for copying from the first packet buffer 12 in the packet controller region to the second packet buffer 14 in the network process region; and the process for notifying, at the control packet processing unit 131, to the data packet processing unit 132 which have been required for the packet transmission process shown in FIG. 1 illustrating a related art, are not required according to the foregoing packet transmission process.

A detailed description follows of a procedure for processing an input packet by the data packet processing unit 231 within the network processor 23. FIG. 4*a* through FIG. 4*c* show data structures for packet processing according to the present invention.

A queue descriptor shown in FIG. 4*a* consists of a packet descriptor index field for representing a packet position within the packet buffer 22 and a packet length field for representing packet size information.

A packet descriptor shown in FIG. 4*b* is a storage area where part of an input packet information is recorded, for storing information frequently accessed by the data packet processing unit 231 upon packet processing. In the embodiment of the present invention, an Ethernet header and an IP header are recorded. The packet descriptor index field within the queue descriptor shown in FIG. 4*a* denotes the present packet descriptor.

FIG. 4*c* shows a packet memory. In the embodiment of the present invention, the packet memory consists of a packet buffer having a fixed size of 2K bytes considering 1518 bytes which is an Ethernet MTU (Maximum Transmit Unit). Also, each packet buffer consists of a packet header extension field of a fixed size (128 bytes) and a reception packet part (consisting of a basic header field and a payload which is actual data).

Particularly, for header conversion of input and output packets considered by the present invention, a "Start of Pkt Offset" field shown in FIG. 4*b* and a packet header extension field shown in FIG. 4*c* are used.

Taking the Ethernet input and the POS output applied to the present invention, as an example, an output interface is determined as a result of processing for an input packet, i.e., as a result of IPv4 lookup through a destination IP within an Ethernet header and an IP header. Then, a header is changed into a header suitable for an output interface before an input packet is forwarded to an output interface. As an output interface is POS according to the embodiment of the present invention, a PPP(Point-to-Point Protocol) packet is generated within a POS frame. An input packet is an Ethernet packet while an output packet is a PPP packet, so that header sizes of the relevant packets are different from each other. Therefore, it is indispensable to modify an actual starting position of a packet that is transmitted through an output interface.

With consideration of such starting position change of a packet due to change of a packet header, a "start of Pkt offset" field is prepared within the packet descriptor in FIG. 4*b*, for representing the starting position, so that a packet processing is easily handled.

The "start of Pkt offset" field in FIG. 4*b* is literally a field for defining a modified value with respect to a packet starting position, in which: a data part of an input packet is invariant and a header part of an input packet is changed in its size depending on the kind of interface, so that a position where a packet actually starts, is modified as much as a header size of a changed interface.

The "start of Pkt offset" field will be described with a header content and its size taken as examples for various interfaces hereinafter.

Ethernet II (14 bytes)
Destination_MAC(6 bytes), Source_MAC(6 bytes), Ethernet_Type(2 bytes)
 IEEE(Institute of Electrical and Electronics Engineers) 802.3 (20 bytes)
Destination_MAC(6 bytes), Source_MAC(6 bytes), Length(2 bytes),
DSAP(1 bytes), SSAP(1 bytes), Control(1 bytes), SNAP(5 bytes)
 IEEE 802.1q (18 bytes)
Destination_MAC(6 bytes), Source_MAC(6 bytes), VLAN_Tag(4 bytes),
Ethernet_Type(2 bytes)
 HDLC(High-Level Data Link Control) POS(4 bytes)
Address(1 bytes), Control(1 bytes), Protocol(2 bytes)
 RPR(Resilient Packet Ring) (18 bytes)
RPR_Header(2 bytes), Destination_MAC(6 bytes), Source_MAC(6 bytes)
Protocol_Type(2 bytes), Header_Checksum(2 bytes)
 MPLS(Multi Protocol Label Switching) (4 bytes)
Label(20 bits), Exp(3 bits), Bos(1 bits), TTL(8 bits)

As header sizes are different for interfaces, respectively, as described above, if an interface of a packet output after an input packet is processed by the network processor, is different from an input interface, then the starting position of the packet is changed. Therefore, a value for the changed amount is recorded on the "start of Pkt offset", whereby the position of a packet could be easily searched for.

For example, if an input interface is the Ethernet II (14 bytes) and an output interface is HDLC POS(4 bytes), a header part of the output interface is 10 bytes smaller, so that 10 bytes is recorded on the "start of Pkt offset" and the packet starts at the position of 138 bytes which is a result obtained by adding 10 bytes to 128 bytes of the packet extension field shown in FIG. 4c.

Conversely, if an input interface is the Ethernet II (14 bytes) and an output interface is IEEE 802.3(20 bytes), a header part of the output interface is 6 bytes larger, so that −6 bytes is recorded on the "start of Pkt offset" and the packet starts at the position of 122 bytes which is a result obtained by subtracting 6 bytes from 128 bytes of the packet extension field shown in FIG. 4c.

The description above has been made with an IPv4 network used as an example. In case of tunneling from an IPv4 network to an IPv6 network, −20 bytes is recorded on the "start of Pkt offset" field, for the packet header sizes of the IPv4 and the IPv6 are 20 bytes and 40 bytes, respectively, so that the packet starts at the position of 108 bytes which is a result obtained by subtracting 20 bytes from 128 bytes.

A value obtained by adding or subtracting a byte size with consideration of the kind of output interface is recorded on the "start of Pkt offset" field.

The method of the present invention in the foregoing, can be realized in the form of a program and stored on a recording medium, such as CD-ROM (Compact Disk-Read Only Memory), RAM (Random Access Memory), a floppy disk, a hard disk, an optical magnetic disk, etc., in a form that could be read by a computer.

As is apparent from the foregoing, according to the present invention, a copying operation is not required upon packet processing between the packet controller and the network processor. Also, upon the occurrence of packet transmission and reception between different data link layers, a packet header moving/copying and a packet alignment-related process due to a change of an input/output packet header are omitted, so that packet transmission performance is improved.

Also, according to the present invention, changing a packet header is easily performed by providing the offset field for changing packet header according to change of input/output interfaces.

While the invention has been shown and described with reference to exemplary embodiments thereof, it will be understood by those skilled in the art that various changes in form and details may be made therein without departing from the spirit and scope of the invention as defined by the appended claims.

What is claimed is:

1. An apparatus to transmit and receive a packet between a network processor and a packet controller, the apparatus comprising:
an input interface to receive an input packet and to deliver the received input packet to a packet controller;
a packet buffer to receive the received input packet from the packet controller, to store the received input packet, and to deliver the stored input packet to a network processor in response to a request from the network processor;
a packet queue to deliver, from the packet controller to the network processor, information associated with the input packet stored in the packet buffer; and
an output interface,
wherein the network processor is configured to receive the stored input packet from the packet buffer, to perform an interface conversion process for the received stored input packet, and to deliver the converted packet to the output interface, using information associated with the input packet delivered by the packet queue,
wherein said packet controller queues said information into said packet queue, said information comprising information corresponding to an input port of said received input packet, a packet buffer address, and a packet size, and
wherein the network processor is further configured to determine whether the input interface and the output interface for the received packet are the same when performing the interface conversion process.

2. The apparatus according to claim 1, wherein the packet queue comprises a circular first in first out packet queue.

3. The apparatus according to claim 1, wherein the packet buffer is further configured to store a packet header extension field when storing the received input packet.

4. The apparatus according to claim 1, wherein the information associated with the input packet comprises a packet descriptor index field for representing a packet position within the packet buffer and a packet length field for representing packet size information.

5. The apparatus according to claim 4, wherein a packet descriptor represented by the packet descriptor index field defines a storage area of the packet buffer where part of information of an input packet is recorded, the storage area of the packet buffer storing information frequently accessed by the network processor upon packet processing.

6. The apparatus according to claim 5, wherein the packet descriptor comprises a "Startofpktoffset" field associated with a change in the header of the input packet due to a difference between the input interface and the output interface, the "Startofpktoffset" field representing a changed value corresponding to a starting position of the input packet, the starting position changing according to a size change in the header of the input packet according to the input interface and the output interface.

7. The apparatus according to claim 6, wherein the changed value recorded on the "Startofpktoffset" field is obtained by adding a size difference between a header size of a packet used in an IPv4 (Internet Protocol Version 4) network and a header size of a packet used in an IPv6 (Internet Protocol Version 6) network upon establishing tunneling from an IPv4 network to an IPv6 network.

8. The apparatus according to claim 3, wherein the information associated with the input packet comprises a packet descriptor index field for representing a packet position within the packet buffer and a packet length field for representing packet size information.

9. The apparatus according to claim 8, wherein a packet descriptor represented by the packet descriptor index field defines a storage area of the packet buffer where part of information of an input packet is recorded, the storage area of the packet buffer storing information frequently accessed by the network processor upon packet processing.

10. The apparatus according to claim 9, wherein the packet descriptor comprises a "Startofpktoffset" field associated with a change in the header of the input packet due to a difference between the input interface and the output interface, the "Startofpktoffset" field representing a changed value corresponding to a starting position of the input packet, the starting position changing according to a size change in the header of the input packet according to the input interface and the output interface.

11. The apparatus according to claim 10, wherein the changed value recorded on the "Startofpktoffset" field is obtained by adding a size difference between a header size of a packet used in an IPv4 (Internet Protocol Version 4) network and a header size of a packet used in an IPv6 (Internet Protocol Version 6) network upon establishing tunneling from an IPv4 network to an IPv6 network.

12. A method for transmitting and receiving a packet between a network processor and a packet controller, the method comprising:
  receiving a packet from an input interface through a packet controller;
  storing the received packet;
  queuing information of the stored packet;
  delivering the queued information to a network processor from the packet controller;
  receiving the stored packet in the network processor using the delivered queued information;
  performing an interface conversion process to convert the received stored packet in the network processor; and
  delivering the converted received stored packet to an output interface,
  wherein said information comprises information corresponding to an input port of said received packet, a packet buffer address, and a packet size, and
  wherein performing the interface conversion process comprises determining, in the network processor, whether or not the input interface and the output interface for the received packet are the same.

13. The method according to claim 12, wherein performing the interface conversion process in the network processor further comprises:
  outputting, according to a relevant entry, the received packet if the input interface and the output interface are the same;
  changing a header of the received packet into a header for the output interface if the input interface is different than the output interface; and
  outputting the received packet with the changed header for the output interface.

14. The method according to claim 12, wherein storing the packet comprises storing a packet header extension field.

15. The method according to claim 13, wherein the queued information comprises a packet descriptor index field representing an area where information associated with the received packet is stored and a packet length field representing packet size information.

16. The method according to claim 12, wherein the queued information comprises a packet descriptor index field representing an area where information associated with the received packet is stored and a packet length field representing packet size information.

17. The method according to claim 14, wherein the queued information comprises a packet descriptor index field representing an area where information associated with the received packet is stored and a packet length field representing packet size information.

18. The method according to claim 15, wherein a packet descriptor represented by the packet descriptor index field defines a storage area of a packet buffer where part of the information associated with the received packet is recorded, the storage area of the packet buffer storing information frequently accessed by the network processor during packet processing.

19. The method according to claim 18, wherein the packet descriptor comprises a "Startofpktoffset" field associated with a change in the header of the received packet due to a difference between the input interface and the output interface, the "Startofpktoffset" field representing a changed value corresponding to a starting position of the input packet, the starting position changing according to a size change in the header of the input packet according to the input interface and the output interface.

20. The method according to claim 19, wherein the changed value recorded on the "Startofpktoffset" field is obtained by adding a size difference between a header size of a packet used in an IPv4 (Internet Protocol Version 4) network and a header size of a packet used in an IPv6 (Internet Protocol Version 6) network upon establishing tunneling from an IPv4 network to an IPv6 network.

21. The method according to claim 16, wherein a packet descriptor represented by the packet descriptor index field defines a storage area of a packet buffer where part of the information associated with the received packet is recorded, the storage area of the packet buffer storing information frequently accessed by the network processor during packet processing.

22. The method according to claim 21, wherein the packet descriptor comprises a "Startofpktoffset" field associated with a change in the header of the received packet due to a difference between the input interface and the output interface, the "Startofpktoffset" field representing a changed value corresponding to a starting position of the input packet, the starting position changing according to a size change in the header of the input packet according to the input interface and the output interface.

23. The method according to claim 22, wherein the changed value recorded on the "Startofpktoffset" field is obtained by adding a size difference between a header size of a packet used in an IPv4 (Internet Protocol Version 4) network and a header size of a packet used in an IPv6 (Internet Protocol Version 6) network upon establishing tunneling from an IPv4 network to an IPv6 network.

24. The method according to claim 17, wherein a packet descriptor represented by the packet descriptor index field defines a storage area of a packet buffer where part of the information associated with the received packet is recorded, the storage area of the packet buffer storing information frequently accessed by the network processor during packet processing.

25. The method according to claim 24, wherein the packet descriptor comprises a "Startofpktoffset" field associated with a change in the header of the received packet due to a difference between the input interface and the output interface, the "Startofpktoffset" field representing a changed value corresponding to a starting position of the input packet, the starting position changing according to a size change in the header of the input packet according to the input interface and the output interface.

26. The method according to claim 25, wherein the changed value recorded on the "Startofpktoffset" field is obtained by adding a size difference between a header size of a packet used in an IPv4 (Internet Protocol Version 4) network and a header size of a packet used in an IPv6 (Internet Protocol Version 6) network upon establishing tunneling from an IPv4 network to an IPv6 network.

27. A non-transitory computer-readable storage medium comprising an executable program, which when executed, performs the following steps:
receiving a packet from an input interface through a packet controller,
storing the received packet;
queuing information of the stored packet;
delivering the queued information to a network processor from the packet controller;
receiving the stored packet in the network processor using the delivered queued information;
performing an interface conversion process to convert the received stored packet in the network processor, and
delivering the converted received stored packet to an output interface,
wherein said information comprises information corresponding to an input port of said received packet, a packet buffer address, and a packet size, and
wherein performing the interface conversion process comprises determining, in the network processor, whether or not the input interface and the output interface for the received packet are the same.

28. The computer-readable storage medium according to claim 27, wherein performing the interface conversion process in the network processor further comprises:
outputting, according to a relevant entry, the received packet if the input interface and the output interface are the same;
changing a header of the received packet into a header for the output interface if the input interface is different than the output interface; and
outputting the received packet with the changed header for the output interface.

29. The computer-readable storage medium according to claim 27, wherein storing the packet comprises storing a packet header extension field.

30. The computer-readable storage medium according to claim 28, wherein the queued information comprises a packet descriptor index field representing an area where information associated with the received packet is stored and a packet length field representing packet size information.

31. The computer-readable storage medium according to claim 27, wherein the queued information comprises a packet descriptor index field representing an area where information associated with the received packet is stored and a packet length field representing packet size information.

32. The computer-readable storage medium according to claim 29, wherein the queued information comprises a packet descriptor index field representing an area where information associated with the received packet is stored and a packet length field representing packet size information.

33. The computer-readable storage medium according to claim 30, wherein a packet descriptor represented by the packet descriptor index field defines a storage area of a packet buffer where part of the information associated with the received packet is recorded, the storage area of the packet buffer storing information frequently accessed by the network processor during packet processing.

34. The computer-readable storage medium according to claim 33, wherein the packet descriptor comprises a "Startofpktoffset" field associated with a change in the header of the received packet due to a difference between the input interface and the output interface, the "Startofpktoffset" field representing a changed value corresponding to a starting position of the input packet, the starting position changing according to a size change in the header of the input packet according to the input interface and the output interface.

35. The computer-readable storage medium according to claim 34, wherein the changed value recorded on the "Startofpktoffset" field is obtained by adding a size difference between a header size of a packet used in an IPv4 (Internet Protocol Version 4) network and a header size of a packet used in an IPv6 (Internet Protocol Version 6) network upon establishing tunneling from an IPv4 network to an IPv6 network.

36. The computer-readable storage medium according to claim 29, wherein a packet descriptor represented by the packet descriptor index field defines a storage area of a packet buffer where part of the information associated with the received packet is recorded, the storage area of the packet buffer storing information frequently accessed by the network processor during packet processing.

37. The computer-readable storage medium according to claim 36, wherein the packet descriptor comprises a "Startofpktoffset" field associated with a change in the header of the received packet due to a difference between the input interface and the output interface, the "Startofpktoffset" field representing a changed value corresponding to a starting position of the input packet, the starting position changing according to a size change in the header of the input packet according to the input interface and the output interface.

38. The computer-readable storage medium according to claim 37, wherein the changed value recorded on the "Startofpktoffset" field is obtained by adding a size difference between a header size of a packet used in an IPv4 (Internet Protocol Version 4) network and a header size of a packet used in an IPv6 (Internet Protocol Version 6) network upon establishing tunneling from an IPv4 network to an IPv6 network.

39. The computer-readable storage medium according to claim 32, wherein a packet descriptor represented by the packet descriptor index field defines a storage area of a packet buffer where part of the information associated with the received packet is recorded, the storage area of the packet buffer storing information frequently accessed by the network processor during packet processing.

40. The computer-readable storage medium according to claim 39, wherein the packet descriptor comprises a "Startofpktoffset" field associated with a change in the header of the received packet due to a difference between the input interface and the output interface, the "Startofpktoffset" field representing a changed value corresponding to a starting position of the input packet, the starting position changing according to a size change in the header of the input packet according to the input interface and the output interface.

41. The computer-readable storage medium according to claim 40, wherein the changed value recorded on the "Startofpktoffset" field is obtained by adding a size difference between a header size of a packet used in an IPv4 (Internet Protocol Version 4) network and a header size of a packet used in an IPv6 (Internet Protocol Version 6) network upon establishing tunneling from an IPv4 network to an IPv6 network.

* * * * *